(12) United States Patent
Chong et al.

(10) Patent No.: US 8,995,910 B2
(45) Date of Patent: Mar. 31, 2015

(54) ANTENNA AND MOBILE TERMINAL HAVING THE SAME

(71) Applicant: LG Electronics Inc., Seoul (KR)

(72) Inventors: Kabsung Chong, Seoul (KR); Jongoh Kim, Seoul (KR); Youngtae Kim, Seoul (KR); Mizi Yi, Seoul (KR); Kiwon Han, Seoul (KR); Euntaek Jeoung, Seoul (KR)

(73) Assignee: LG Electronics Inc., Seoul (KR)

( * ) Notice: Subject to any disclaimer, the term of this patent is extended or adjusted under 35 U.S.C. 154(b) by 198 days.

(21) Appl. No.: 13/685,208

(22) Filed: Nov. 26, 2012

(65) Prior Publication Data

US 2013/0267170 A1    Oct. 10, 2013

(30) Foreign Application Priority Data

Apr. 5, 2012   (KR) .................. 10-2012-0035626

(51) Int. Cl.
| | |
|---|---|
| *H04B 5/00* | (2006.01) |
| *H01Q 1/24* | (2006.01) |
| *H01Q 1/38* | (2006.01) |
| *H01Q 1/40* | (2006.01) |
| *H01Q 5/00* | (2006.01) |
| *H01Q 7/00* | (2006.01) |
| *H01Q 7/08* | (2006.01) |
| *H01Q 21/28* | (2006.01) |
| *H04M 1/02* | (2006.01) |

(52) U.S. Cl.
CPC ............ *H04B 1/3833* (2013.01); *H01Q 1/243* (2013.01); *H01Q 1/38* (2013.01); *H01Q 1/40* (2013.01); *H01Q 5/0072* (2013.01); *H01Q 7/00* (2013.01); *H01Q 7/08* (2013.01); *H01Q 21/28* (2013.01); *H04M 1/026* (2013.01); *H04B 5/0081* (2013.01)

USPC ......... 455/41.1; 455/41.2; 455/573; 343/725; 343/728

(58) Field of Classification Search
CPC ....................................................... H01Q 1/38
USPC ............. 455/41.1, 41.2, 573, 575.7; 343/725, 343/728, 787, 788, 841, 842
See application file for complete search history.

(56) References Cited

U.S. PATENT DOCUMENTS

| | | | |
|---|---|---|---|
| 8,353,097 B2 * | 1/2013 | Byun et al. ..................... | 29/600 |
| 2008/0111518 A1 | 5/2008 | Toya | |
| 2011/0234014 A1 * | 9/2011 | Kato et al. ..................... | 307/104 |
| 2012/0146865 A1 * | 6/2012 | Hayashi et al. ............... | 343/750 |

FOREIGN PATENT DOCUMENTS

| | | |
|---|---|---|
| EP | 1633017 A1 | 3/2006 |
| JP | 2007-304910 A | 11/2007 |
| WO | WO2011/122162 A1 | 10/2011 |

\* cited by examiner

*Primary Examiner* — Tuan H Nguyen
(74) *Attorney, Agent, or Firm* — Birch, Stewart, Kolasch & Birch, LLP

(57) ABSTRACT

An antenna and a mobile terminal having the antenna are discussed. According to an embodiment, the antenna can include a flexible board having a first region and a second region; a high frequency antenna pattern formed in the first region of the flexible board to transceive a wireless signal by detecting a magnetic flux; a low frequency antenna pattern formed in the second region of the flexible board to generate an induced current; and a magnetic sheet stacked on one surface of the flexible board to simultaneously cover both of the high frequency antenna pattern and the low frequency antenna pattern, the magnetic sheet having a high magnetic permeability for both a high frequency and a low frequency.

18 Claims, 9 Drawing Sheets

US 8,995,910 B2

ANTENNA AND MOBILE TERMINAL HAVING THE SAME

Pursuant to 35 U.S.C. §119(a), this application claims the benefit of earlier filing date and right of priority to Korean Application No. 10-2012-0035626, filed on Apr. 5, 2012, the contents of which are hereby incorporated by reference herein in their entirety.

BACKGROUND OF THE INVENTION

1. Field of the Invention

The present invention relates to a mobile terminal, and more particularly, to an antenna and mobile terminal having the same. Although the present invention is suitable for a wide scope of applications, it is particularly suitable for minimizing an antenna thickness of the mobile terminal capable of wireless communications and wireless charging.

2. Discussion of the Related Art

Generally, terminals can be classified into mobile terminals and stationary terminals. In addition, the mobile terminals can be further classified into handheld terminals and vehicle mount terminals. Further, a mobile terminal can perform various functions such as data and voice communications, capturing images and video via a camera, recording audio, playing music files and outputting music via a speaker system, and displaying images and video on a display.

The mobile terminal also includes a broadcast receiving function, a wireless internet function, a short range communication (or near field communication (NFC)) function and the like in addition to a basic phone call function. Various kinds of antennas may also be mounted on mobile terminals for individual wireless communication. In addition, a mobile terminal including a wireless charging function for charging a battery of the terminal has been released.

However, the number of components of a mobile terminal continues to increase for implementing the various functions, which increases the thickness of the mobile terminal.

SUMMARY OF THE INVENTION

Accordingly, one object of the present invention is to provide a mobile terminal that substantially obviates one or more problems due to limitations and disadvantages of the related art.

Another object of the present invention is to provide an antenna and mobile terminal having the same, by which an antenna thickness of the mobile terminal capable of wireless communications and a wireless charging can be minimized.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an antenna according to one embodiment of the present invention may include a flexible board having a $1^{st}$ region and a $2^{nd}$ region, a high frequency pattern formed in the $1^{st}$ region of the flexible board to transceive a wireless signal by detecting a magnetic flux around a terminal, a low frequency pattern formed in the $2^{nd}$ region of the flexible board to generate an induced current, and a magnetic sheet stacked on one surface of the flexible board to simultaneously cover both of the high frequency pattern and the low frequency pattern, the magnetic sheet configured to have a high magnetic permeability for a high frequency and a high magnetic permeability for a low frequency.

In another aspect of the present invention, a mobile terminal according to another embodiment of the present invention may include a case configured to form an exterior of the mobile terminal, the case having electronic components mounted inside, a backside cover configured to cover one side of the case; and an antenna attached to an inner surface of the backside cover, the antenna including a flexible board having a $1^{st}$ region and a $2^{nd}$ region, a high frequency pattern formed in the $1^{st}$ region of the flexible board to transceive a wireless signal by detecting a magnetic flux around the mobile terminal, a low frequency pattern formed in the $2^{nd}$ region of the flexible board to generate an induced current, and a magnetic sheet stacked on one surface of the flexible board to simultaneously cover both of the high frequency pattern and the low frequency pattern, the magnetic sheet configured to have a high magnetic permeability for a high frequency and a high magnetic permeability for a low frequency.

Effects and/or advantages obtainable from the present invention are non-limited the above mentioned effect. In addition, other unmentioned effects and/or advantages can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

In the following detailed description, reference is made to the accompanying drawing figures which form a part hereof, and which show by way of illustration specific embodiments of the invention.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of mobile terminals. Examples of such terminals include mobile phones, user equipments, smart phones, digital broadcast receivers, personal digital assistants, laptop computers, portable multimedia players (PMP), navigators and the like.

Figure 1:
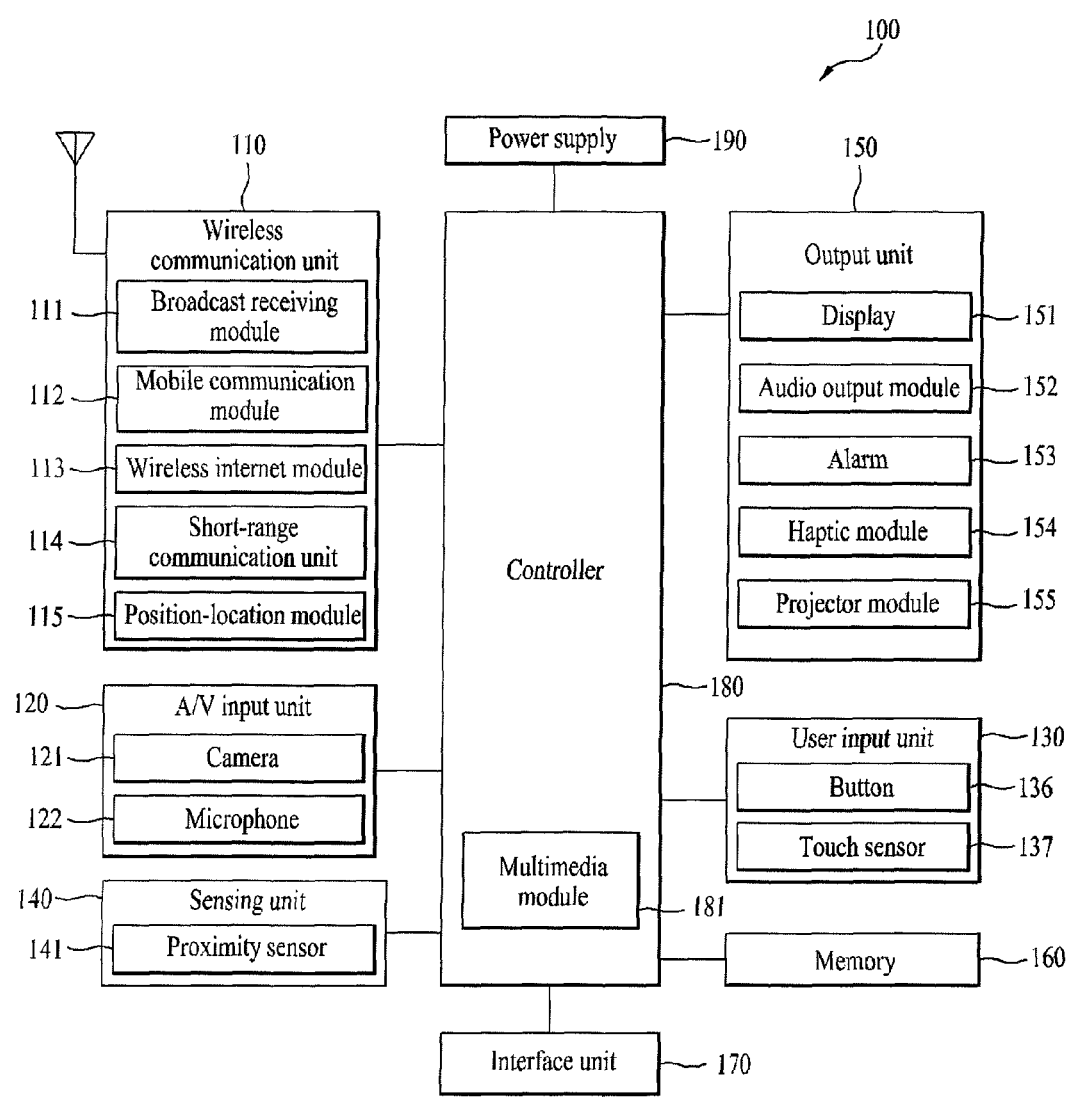
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. For simultaneous receptions of at least two broadcast channels or broadcast channel switching, at least two broadcast receiving modules may be provided to the mobile terminal 100.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. In addition, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless interne module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. The user input unit 130 may include a button 136 provided to front/rear/lateral side of the mobile terminal 100 and a touch sensor (constant pressure/electrostatic) 137 and may further include a key pad, a dome switch, a jog wheel, a jog switch and the like [not shown in the drawing].

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 can include a proximity sensor 141. Besides, the proximity sensor shall be described later.

The output unit 150 generates outputs relevant to the senses of sight, hearing, touch and the like. In addition, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

When the display unit 151 and the touch sensor 137 configure a layered structure or are built in one body (such a configuration shall be named 'touchscreen'), the display unit 151 may be used as an input device as well as an output device. If the touch sensor has such a configuration as a touch film, a touch sheet, a touchpad and the like, for example, it may be stacked on the display unit 151 to configure a layered structure or may be included in a configuration of the display unit 151 to be built in one body of the display unit 151.

The touch sensor 137 can be configured to convert a pressure applied to a specific portion of the display 151 or a variation of a capacitance generated from a specific portion of the display 151 to an electric input signal. Moreover, it is able to configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Figure 2:
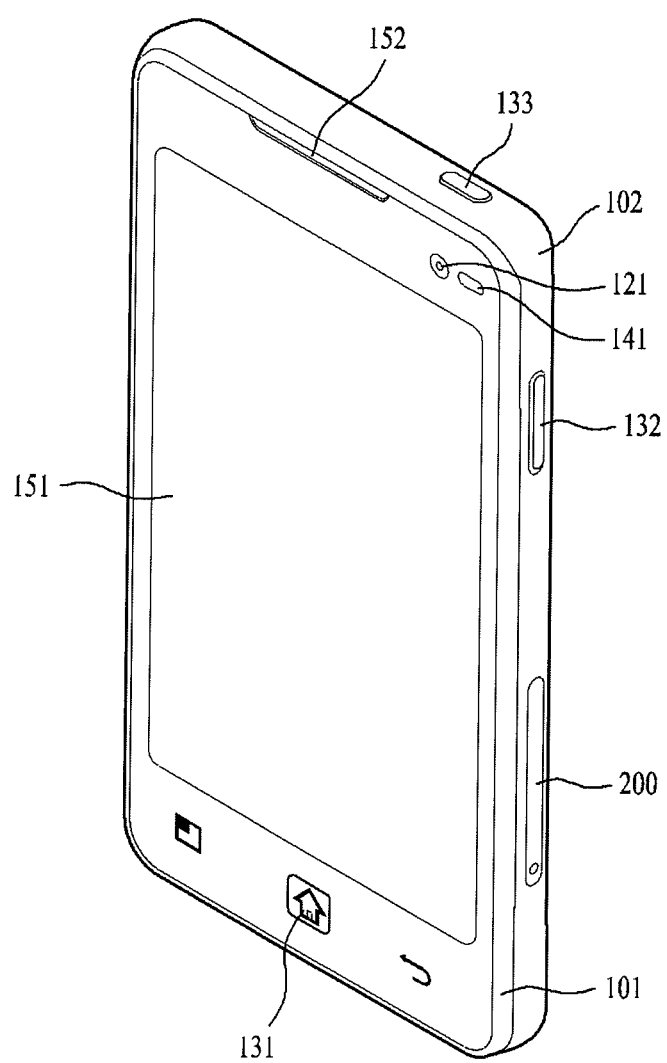
FIG. 2 is a front perspective diagram of a mobile terminal according to one embodiment of the present invention.

Referring to FIGS. 1 and 2, a proximity sensor 141 can be provided to an internal area of the mobile terminal 100 enclosed by the touchscreen or around the touchscreen. The proximity sensor 141 is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

For clarity and convenience of the following description, if an action is performed in a manner of placing a pointer over the touchscreen by being proximate to the touchscreen without coming in contact with the touchscreen, it may be named a proximity touch. If an action is performed in a manner of enabling a pointer to actually come in contact with the touchscreen, it may be named a contact touch. A position, at which the proximity touch with a pointer is performed on the touchscreen, may mean the position at which the pointer vertically opposes the touchscreen in case of the proximity touch with the pointer.

The proximity sensor 141 detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output in a manner of being synthesized together or can be output in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Next, FIG. 2 is a front perspective diagram of a mobile terminal according to one embodiment of the present invention. The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case configuring an exterior thereof. In the present embodiment, the case is divided into a front case 101 and a rear case 102. Various electric/electronic parts are loaded in a space provided between the front and rear cases 101 and 102

Occasionally, electronic components can be mounted on a surface of the rear case 102. The electronic part mounted on the surface of the rear case 102 may include such a detachable part such as a battery, a USIM card, a memory card and the like. In doing so, the rear case 102 may further include a backside cover 103 (see FIG. 3) configured to cover the surface of the rear case 102. In particular, the backside cover 103 has a detachable configuration for the user's convenience. If the backside cover 103 is detached from the rear case 102, the surface of the rear case 102 is exposed.

Figure 3:
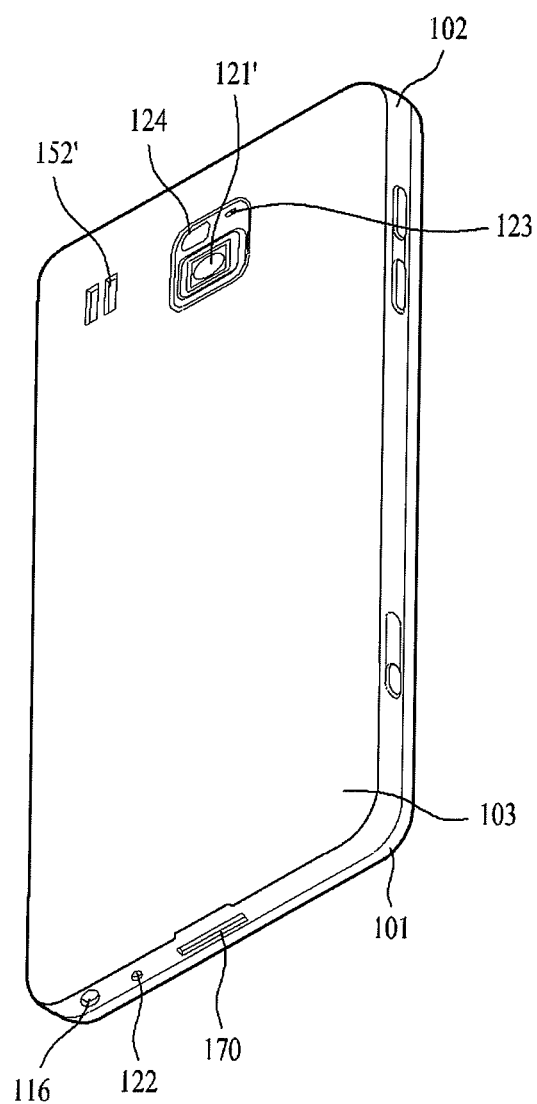
FIG. 3 is a rear perspective diagram of a mobile terminal according to one embodiment of the present invention.

Referring to FIG. 3, if the backside cover 103 is attached to the rear case 102, a lateral side of the rear case 102 may be exposed in part. If a size of the backside cover 103 is decreased, a rear side of the rear case 102 may be exposed in part. If the backside cover 103 covers the whole rear side of the rear case 102, it may include an opening 103' (see FIG. 4) configured to expose a camera 121' or an audio output unit 152' externally.

The cases 101, 102 and 103 can be formed by injection molding of synthetic resin or can be formed of metal substance such as stainless steel (STS), titanium (Ti) or the like for example. A display 151, an audio output unit 152, a camera 121, user input units 130/131 and 132, a microphone 122, an interface 170 and the like can be provided to the case 101 or 102.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. In addition, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. In addition, a command for a volume adjustment of sound output from the audio output unit 152 and the like can be input to the second manipulating unit 132, a command for a switching to a touch recognizing mode of the display 151 and the like can be input to the second manipulating unit 133.

A button type is configured to recognize a pressure applied by a user to each of the manipulation units 131, 132 and 133. If a touch sensor is provided to each of the manipulation units 131, 132 and 133 in addition to the display unit 151, a user's command can be input by a user's touch. FIG. 2 also illustrates an antenna 200.

FIG. 3 is a perspective diagram of a backside of the terminal shown in FIG. 2. Referring to FIG. 3, the camera 121' can be additionally provided to a backside of the terminal body, and more particularly, to the rear case 102. The camera 121 has a photographing direction that is substantially opposite to that of the former camera 121 shown in FIG. 2 and may have pixels differing from those of the firmer camera 121.

Preferably, for instance, the camera 121 has low pixels enough to capture and transmit a picture of user's face for a video call, while the camera 121' has high pixels for capturing a general subject for photography without transmitting the captured subject. In addition, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

The additional audio output unit 152' can be provided to the backside of the terminal body. The additional audio output unit 152' is able to implement a stereo function together with the former audio output unit 152 shown in FIG. 2 and may be used for implementation of a speakerphone mode in talking over the terminal. A retractable broadcast antenna is also shown in FIG. 3.

Figure 4:
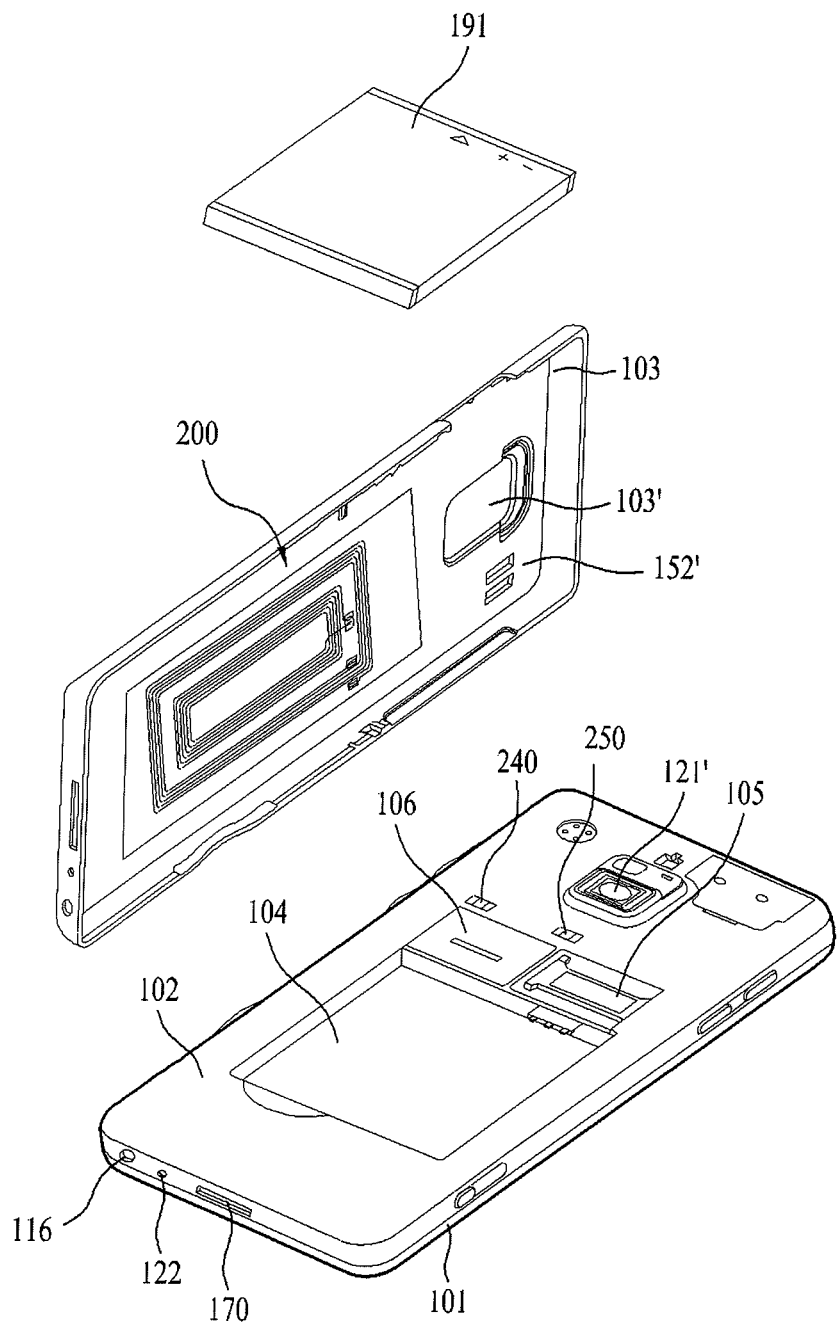
FIG. 4 is a perspective diagram of a mobile terminal according to one embodiment of the present invention, in which a backside cover detached from a backside of the mobile terminal is shown.

FIG. 4 is a perspective diagram of a mobile terminal according to one embodiment of the present invention, in which the backside cover 103 detached from a backside of the mobile terminal is shown. Referring to FIG. 4, the front case 101, the rear case 102, the backside cover (or a battery cover) 103, the camera 121', the interface 170, the microphone 122, the audio output unit 152', a battery 191, a battery loading part 104, a USIM card loading part 105, a memory card loading part 106 and the like are shown.

That is, a space for mounting such an external part as the battery loading part 104, the USIM card loading part 105, the memory card loading part 106 and the like can be provided to a surface of the rear case 102. In general, the external components mounted on the surface of the rear case 102 may be provided to enhance various functions of the mobile terminal 100 to meet the diversified user's needs.

As performance of the mobile terminal 100 is diversified and enhanced, power consumption increases correspondingly. To compensate for this increasing power consumption, a replaceable battery can be configured as shown in FIG. 4. For the replaceable type battery, the battery loading part 104 is formed on the surface of the rear case 102 to enable a user to attach/detach the battery to/from the rear case 102. In particular, a contact terminal is provided to the battery loading part 104 to be electrically connected with a part loaded within the rear case 102.

The USIM card loading part 105 or the memory card loading part 106, as shown in FIG. 4, may be provided next to the battery loading part 104. Alternatively, the USIM card loading part 105 or the memory card loading part 106 may be provided to a bottom side of the battery loading part 104 to be externally exposed if the battery 191 is detached from the battery loading part 104. If so, the size of the battery loading part 104 can be increased to enlarge a size of the battery 191.

Although FIG. 4 shows that the USIM card loading part 104 or the memory card loading part 106 is mounted on a rear side of the rear case 102, the USIM card loading part 104 or the memory card loading part 106 may be detachably inserted in a lateral side of the mobile terminal 100.

As the backside cover 103 is configured to cover the surface of the rear case 102, the battery 191, the USIM card, the memory card and the like mounted on the surface of the rear case 102 can be fixed thereto not to be separated from the rear case 102. In addition, the backside cover 103 protects the external components against external shock or particles. Recently, for the purpose of an additional water-proof function, the backside cover 103 may further include a waterproof structure for sealing a gap between the rear case 102 and the backside cover 103 assembled together in order to prevent the external components against water.

The ongoing necessity for the antenna 200 to perform wireless communications with an external device and server is rising to keep up with the diversified functions of the mobile terminal 100. For instance, the antenna 200 for receiving broadcast information such as an EPG (Electronic Program Guide) of the DMB (Digital Multimedia Broadcasting), an ESG (Electronic Service Guide) of the DVB-H (Digital Video Broadcast-Handheld) and the like, an antenna for wireless internet such as Wibro, HSDPA, GSM, CDMA, WCDMA, LTE and the like, and the antenna 200 for short-range wireless communication such as Bluetooth, RFID (Radio Frequency Identification), IrDA (infrared Data Association), UWB (Ultra Wideband), ZigBee and the like are necessary for the mobile terminal 100.

The above antenna 200 is preferably formed in a wide area for radio reception. More preferably, the antenna 200 is situated near a surface of the mobile terminal 100 to avoid being affected by other electronic components. Therefore, the antenna 200 may be preferably provided to the backside cover 103 capable of securing a wide area in which electronic components are not mounted in general, as shown in FIG. 4.

Figure 5:
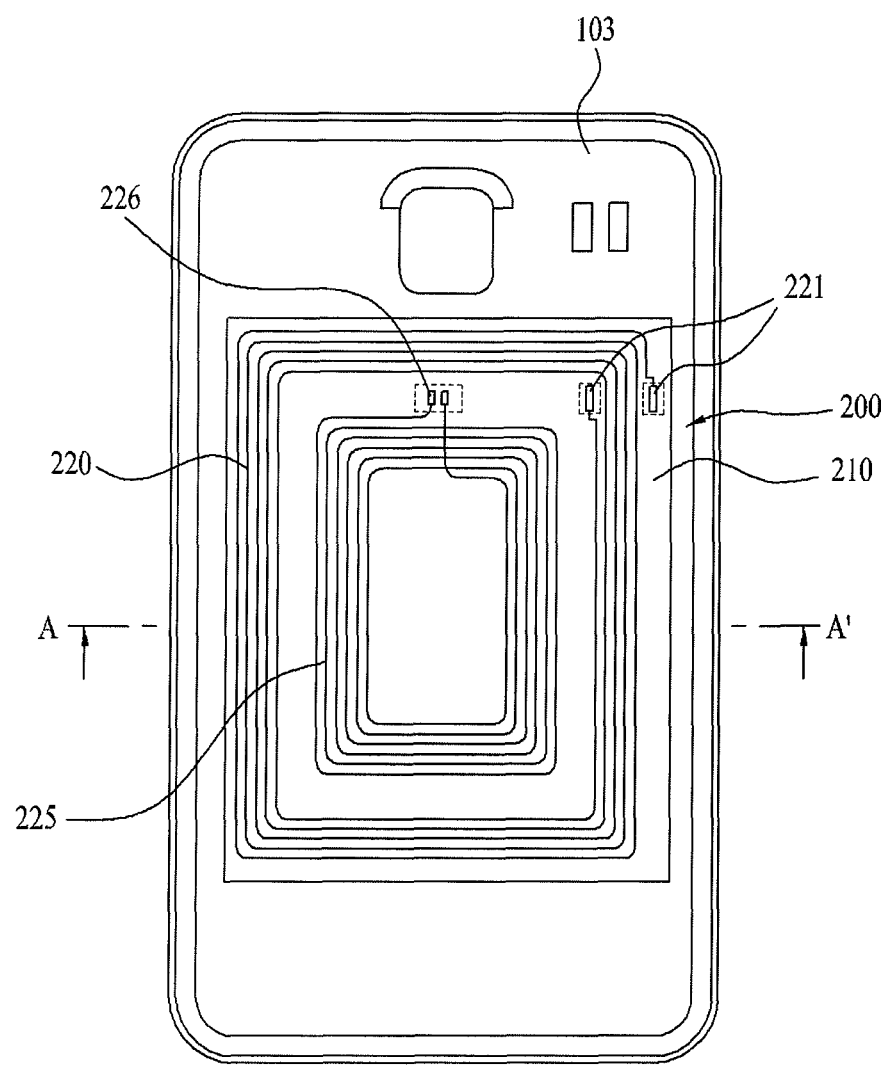
FIG. 5 is a layout of a mobile terminal according to one embodiment of the present invention.
Figure 6:
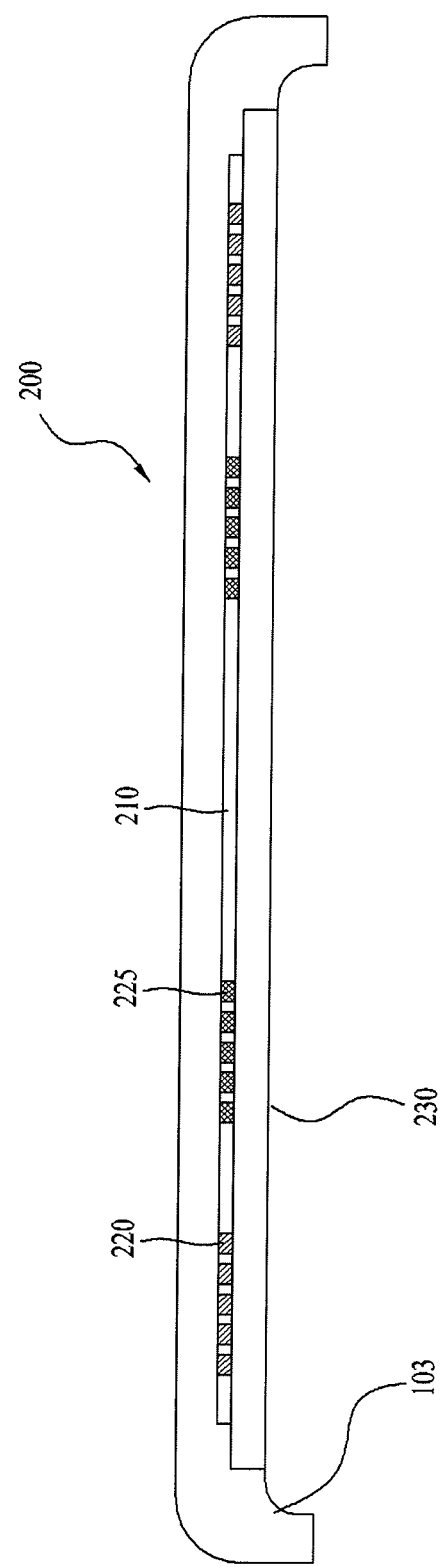
FIG. 6 is a cross-sectional diagram of a mobile terminal according to one embodiment of the present invention.

In the following description, the antenna 200 according to the present invention is explained in more detail with reference to FIGS. 5 to 7. FIG. 5 is a layout of the mobile terminal 100 according to one embodiment of the present invention, in which the antenna 200 according to one embodiment of the present invention is attached to the backside cover 103 of the mobile terminal 100. FIG. 6 is a cross-sectional diagram of the antenna 200 according to one embodiment of the present invention. In addition, FIG. 7 is an exploded perspective diagram of the antenna 200 according to one embodiment of the present invention.

Figure 7:
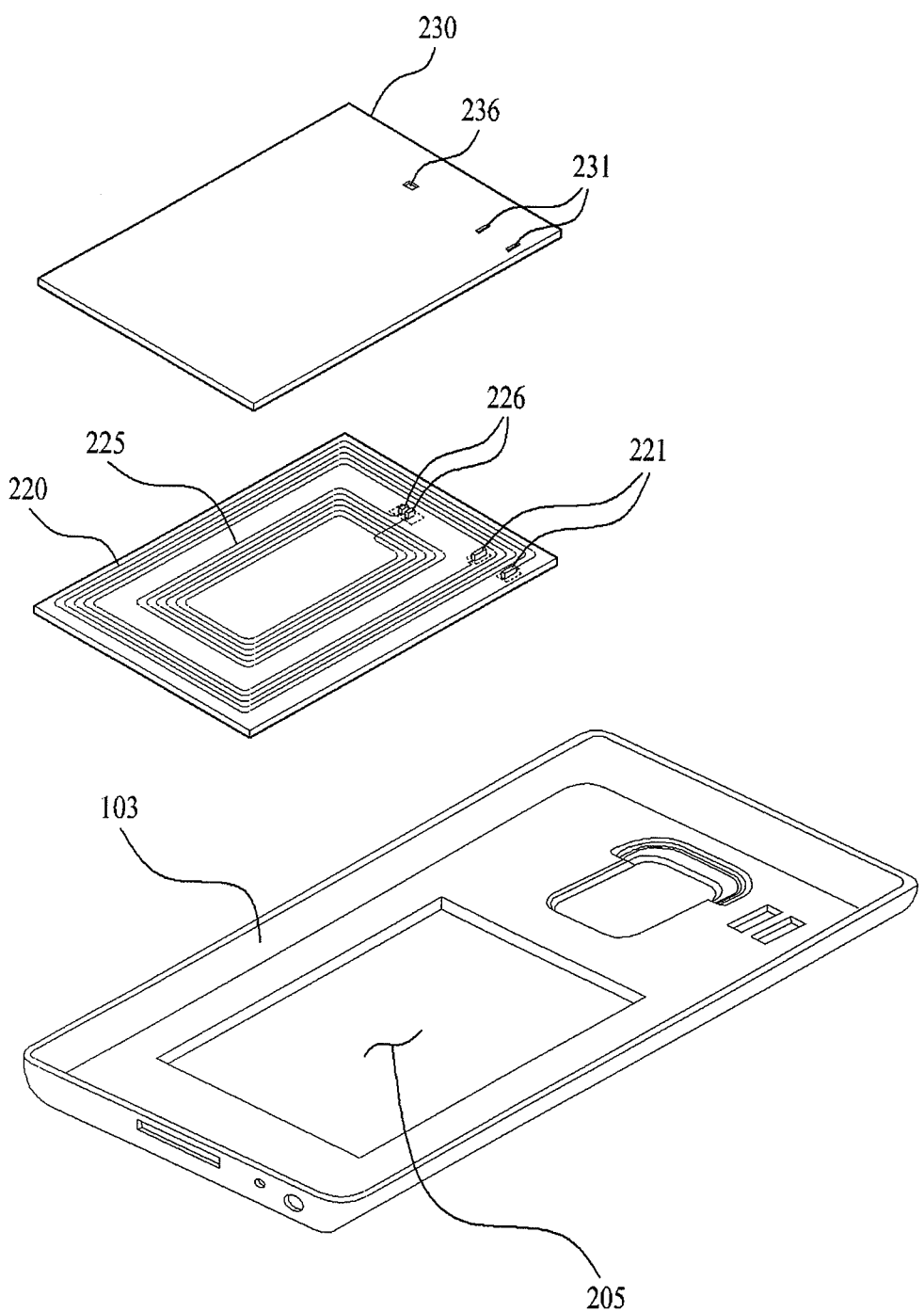
FIG. 7 is a perspective diagram of a mobile terminal according to one embodiment of the present invention.

Referring to FIGS. 5 to 7, the antenna 200 according to the present invention includes a flexible board 210, two types of patterns 220, 225 and a magnetic sheet 230. The two types of the patterns include a high frequency pattern 220 and a low-frequency pattern 225. In particular, the patterns are characterized in using different frequency bands. In more particular, the high frequency pattern 220 is suitable for wireless communications, while the low frequency pattern 225 is generally suitable for a wireless charging of a battery.

In more detail, a wireless charging technology used for the mobile terminal 100 is based on the electromagnetic induction principle. The electromagnetic induction forms a magnetic field attributed to an applied current. If the mobile terminal 100 is placed in the magnetic field, a charging is achieved by current flowing in the low frequency pattern provided to the mobile terminal 100, and more particularly, in the wireless charging coil 225.

A frequency may also vary by depending on a transmitted power level. Generally, a power used for a small-scale home appliance such as the mobile terminal 100 and the like is relatively low below several hundreds kHz. As the functions of the mobile terminal 100 are diversified, the wireless communications may need an antenna for such a function as NFC (near field communication), RFID (radio frequency identification) and the like in addition to an antenna for radio transmissions of phone calls. In particular, a frequency used for communication varies in accordance with a wireless communication technology. In order to transmit a considerable volume of data, the frequency used for communication is relatively higher than the frequency used for the wireless charging.

Examples of a communication system used by the high frequency pattern 220 of the present invention include a near field communication (NFC). The NFC is a sort of an electronic tag (e.g., RFID) and includes a non-contact wireless communication module that uses about 13.56 MHz frequency band.

The NFC is the technology for transmitting data between terminals 100 situated in a close distance of about 10 cm. Because a communication distance of the NFC is relatively short, the NFC is the next generation short range communication technology owing to relatively excellent security and low price. Data reading and writing are available for the NFC. In addition, no setting is required between devices unlike Bluetooth. Therefore, the ongoing trend is to give the NFC function to the mobile terminal 100.

For the wireless charging, the wireless charging coil 225 is preferably arranged wide on the mobile terminal 100 to facilitate a charging irrespective of a position of the mobile terminal 100 placed on a charging device. Moreover, for the NFC, since the antenna is placed in the vicinity of a reader for communication, it may be difficult for the communication to be smoothly performed in accordance with a position of the antenna 225. Therefore, the high frequency pattern 220 is preferably arranged on a wide area as shown in FIG. 5.

In particular, since the wireless charging or the NFC is performed in a close distance range, the antenna for the wireless charging or the NFC is preferably distributed on an area wider than that of the antenna for a remote distance communication. Therefore, as mentioned in the foregoing description, the antenna for the wireless charging or the NFC is preferably provided to the backside cover 103.

When the wireless charging coil 225 and the wireless communication antenna 220 are arranged in the same area, interference may occur in-between. Hence, the wireless charging coil 225 and the wireless communication antenna 220 may be arranged in a $1^{st}$ region and a $2^{nd}$ region, respectively. In this instance, the 1st region is situated on an edge of the flexible board and the $2^{nd}$ region is surrounded by the $1^{st}$ region.

In the drawing, the high frequency pattern 220 and the low frequency pattern 225 are situated at the 1st region and the 2nd region, respectively, by which the locations of the high frequency pattern 220 and the low frequency pattern 225 are non-limited. Alternatively, the locations of the high frequency pattern 220 and the low frequency pattern 225 may be switched. In order to cover a wide area, each of the high frequency pattern 220 and the low frequency pattern 225 may be configured to have a whirling pattern.

Figure 8:
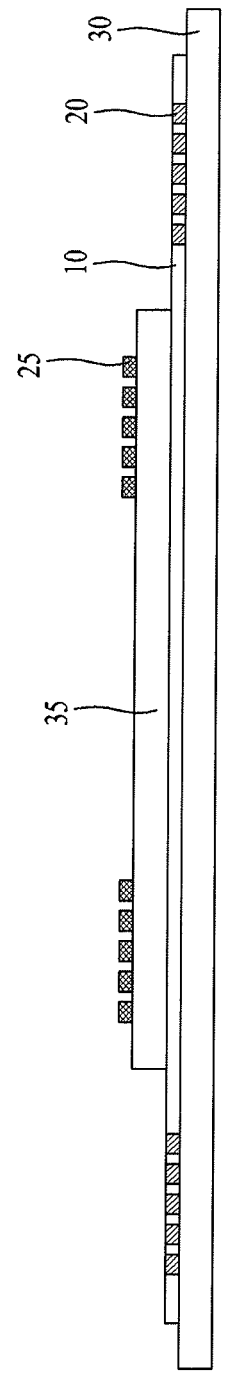
FIG. 8 is a cross-sectional diagram of a mobile terminal according to a related art.

Meanwhile, according to the related art, referring to FIG. 8, the NFC and wireless charging functions are given to a mobile terminal in a manner that the wireless charging coil 25 is stacked on the mobile terminal having an NFC antenna 20 disposed in a board 10. Yet, in the related art structure, an overall thickness is problematically increased. Specifically, the wireless charging coil 25 normally includes a coli of 0.3 mm and the magnetic sheet 30 for eliminating noise, which affects electromagnetic waves for a charging, is normally thick. Hence, since the overall thickness of the antenna becomes three times thicker than the case of having the NFC antenna 20 only, it may be difficult to reduce the thickness of the mobile terminal.

According to the present invention, in order to reduce a thickness of the antenna 200 for the NFC and the wireless charging, referring to FIG. 5, the high frequency pattern 220 and the low frequency pattern 225 are formed in the same plane. Because the patterns of two types are situated in the same plane, the overall thickness of the antenna 200 is reduced twice smaller than that of the related art antenna shown in FIG. 8.

Further, the flexible board 210 is configured to fill an empty space between the patterns and is made of such an elastically shape-variable material as PVC (polyvinylchloride) and the like. The flexible board 210 is provided to protect the high frequency pattern 220 and the low frequency pattern 225.

If a cross-section of each of the high frequency pattern 220 and the low frequency pattern 225 is too small, it may not be preferable to generate an induced current due to an increasing resistance. Hence, in order to secure a large cross-sectional area of the corresponding pattern by minimizing a corresponding thickness, referring to FIG. 5, the flexible board 210 and each of the high frequency pattern 220 and the low frequency pattern 225 may be formed equal to each other in thickness. In particular, each of the high frequency pattern 220 and the low frequency pattern 225 may be exposed via both surfaces of the flexible board 210 by going through the flexible board 210.

Referring to FIG. 6, the antenna 200 according to the present invention may include a 1st layer including the flexible board 210 and the patterns 220 and 225 and a 2nd layer including the magnetic sheet 230 configured to cover the flexible board 210 and the patterns. As the high frequency pattern 220 and the low frequency pattern 225 and the flexible board 210 are already mentioned in the foregoing description, their details are omitted from the following description.

Regarding the magnetic sheet 230 configuring the 2nd layer, if a conductive material such as a battery, a metal surface of a printed circuit board and the like is situated in a device that uses an induced current, it may inhibit the magnetic flux exchange. If a magnetic flux variation externally occurs from such a conductor as a metal, an eddy current flows in the conductor to generate a counteractive magnetic flux that impedes the magnetic flux variation. Hence, the magnetic flux is lost to degrade the signal reception or wireless charging function of the antenna 200.

According to the present invention, the magnetic sheet 230 is attached to both of the wireless charging coil 225 (i.e., the low frequency pattern) and the NFC antenna 220 (i.e., the high frequency pattern), thereby preventing the performance degradation caused by other electronic components of the mobile terminal 100.

The magnetic sheet 230 is formed as a thin sheet by mixing magnetic metal and polymer together. The magnetic sheet 230 suppresses noise of an electronic device. In addition, performance of the magnetic sheet 230 depends on the magnetic permeability of the magnetic metal added to the magnetic sheet 230.

The magnetic sheet 230 is generally formed of a ferrite sheet. The ferrite is a generic name of magnetic ceramic containing ion oxide. Te ferrite is normally used for magnetic tape, or a computer memory substance. Recently, the ferrite is frequently used as a substance for electromagnetic absorber.

The ferrite sheet is formed into a thin sheet by mixing a metallic powder containing such a substance as Ni, Zn, Mn, Mg, Cu and the like with a polymer paste. The magnetic sheet 230 has a magnetic permeability varying by depending on a type of frequency. If the magnetic metal of the same property is used, electromagnetic waves can be absorbed by differentiating a thickness of the magnetic sheet 230 in accordance with a frequency.

According to the related art of FIG. 8, because a magnetic sheet 30 for an NFC antenna and a magnetic sheet 35 for a wireless charging coil are separately used, the magnetic sheet 30 used for the NFC antenna 20 has a high magnetic permeability on a high frequency but the magnetic sheet 35 used for the wireless charging coil 25 has a high magnetic permeability on a low frequency.

Figure 9:
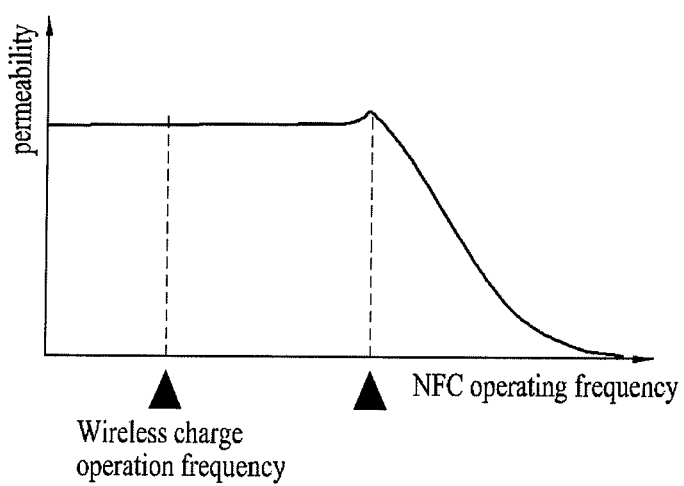
FIG. 9 is a graph of characteristics of a magnetic sheet of a mobile terminal according to one embodiment of the present invention.

On the contrary, referring to FIG. 9, the magnetic sheet 230 of the present invention is characterized in that the magnetic permeability is high on both of the frequency for the wireless charging (i.e., the low frequency) and the frequency for the NFC (i.e., the high frequency).

Generally, the wireless charging uses a frequency in a range between 100 kHz and 200 kHz and the wireless communication uses a frequency on about 13.56 MHz. Hence, the magnetic sheet 230 of the present invention shows high magnetic permeability on a frequency in a range between 100 kHz and 14 MHz. Since a magnetic permeability ($\mu r$) for noise elimination ranges 130 to 190, the magnetic sheet 230 having the magnetic permeability 130~190 in a frequency range between 100 kHz and 14 MHz is used.

The magnetic sheet 230 may have the good magnetic permeability on both of the high and low frequencies may be provided in a manner of differentiating components or quantities of the magnetic substance mixed with the magnetic sheet or increasing the thickness of the magnetic sheet 230 physically.

For instance, the magnetic sheet 230 of the present invention capable of good absorbance on both of the high frequency and the low frequency can be prepared in a manner of mixing a substance having a molecular structure different from that of the related art as a magnetic substance (e.g., ferrite) mixed with the magnetic sheet 230, differentiating a quantity of the magnetic substance, or increasing a thickness of the magnetic sheet 230 to be greater than that of the related art magnetic sheet 30 used for the related art NFC antenna 20.

As shown in FIGS. 5 and 7, connecting terminals 221 are formed at both end portions of the low frequency pattern 225, respectively. In addition, connecting terminals 226 are formed at both end portions of the high frequency pattern 220, respectively. In addition, each of the connecting terminals 221 and 226 is connected to the internal electronic components of the mobile terminal 100. The Connecting terminals 221 connected with both end portions of the low frequency pattern 225 may be called a 1$^{st}$ connecting terminal 221 and the connecting terminals 226 connected with both end portions of the high frequency pattern 220 may be named a 2$^{nd}$ connecting terminal 226.

Next, FIG. 7 is an exploded perspective diagram of the antenna 200 according to the present invention, in which the antenna 200 is separated by layers. Referring to FIG. 7, in order for the connecting terminals 221 and 226 to be connected with the electronic components, the magnetic sheet 230 may include an opening 231 for the connecting terminals 221 and an opening 236 for the connecting terminals 226.

The connecting terminals 221 and 226 go through the magnetic sheet 230 to be exposed on the surface of the magnetic sheet 230 and are then connected with the body terminals 240 and 250 formed on the surface of the rear case of the mobile terminal 100 shown in FIG. 4, respectively. In this instance, the body terminals 240 and 350 may include the 1$^{st}$ body terminal 240 connected with the printed circuit board and the 2$^{nd}$ body terminal 250 connected with the battery.

When the backside cover 103 is attached to the case, the 1$^{st}$ connecting terminal 221 is connected with the 1$^{st}$ body terminal 240. In particular, a signal received by the high frequency pattern 220 is forwarded to the printed circuit board of the mobile terminal 100 via the 1$^{st}$ connecting terminal 221 and the 1$^{st}$ body terminal 240.

When the backside cover 103 is attached to the case, the 2$^{nd}$ connecting terminal 226 is connected with the 2$^{nd}$ body terminal 250. In particular, a current flowing in the low frequency pattern 225 by a magnetic field is delivered to the battery via the 2$^{nd}$ connecting terminal 226 and the 2$^{nd}$ body terminal 250, thereby charging the battery with electricity.

Meanwhile, when the antenna 200 of the present invention is attached to an inner surface of the backside cover 103, a recessed part 205 is formed on the inner surface of the backside cover 103 for loading the antenna 200 thereon in order to minimize an overall thickness of the mobile terminal 100. Hence, the overall thickness of the mobile terminal 100 can be decreased by the thickness or depth of the recessed part 205.

In the drawing, both of the magnetic sheet 230 and the flexible board 210 are received in the recessed part 205. Alternatively, the flexible board 210 and the patterns 220 and 225 may be configured to be loaded on the recessed part 205 only.

As mentioned in the above description, according to at least one of the embodiments of the present invention, the antenna thickness in the mobile terminal is decreased, whereby the mobile terminal can be slimmed.

In addition, as both of the wireless charging coil and the NFC antenna are formed in one body into a single magnetic sheet, the number of components can be decreased to reduce costs. Moreover, the present invention forms a wireless charging coil and an NFC antenna at the same time to simplify a manufacturing process, thereby reducing a processing time and a manufacturing cost.

Accordingly, the present invention provides the following effects and/or features.

First of all, according to at least one of the embodiments of the present invention, an antenna thickness of a mobile terminal is decreased, whereby the mobile terminal can be slimmed.

Secondly, the present invention constructs a wireless charging coil and a short range communication (or NFC) antenna with a single magnetic sheet formed in one body, thereby decreasing the number of components to reduce product costs.

Thirdly, the present invention forms a wireless charging coil and a short range communication (or NFC) antenna at the same time to simplify a manufacturing process, thereby reducing a processing time and a manufacturing cost.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An antenna, comprising:
   a flexible board having a first region and a second region;
   a high frequency antenna pattern formed in the first region of the flexible board to transceive a wireless signal by detecting a magnetic flux;
   a low frequency antenna pattern formed in the second region of the flexible board to generate an induced current; and
   a magnetic sheet stacked on one surface of the flexible board to simultaneously cover both of the high frequency antenna pattern and the low frequency antenna pattern, the magnetic sheet having a high magnetic permeability for both a high frequency and a low frequency,
   wherein the high and low frequency antenna patterns each have a whirling shape, and
   wherein the high and low frequency antenna patterns are disposed in a same plane.

2. The antenna of claim 1, wherein the high frequency antenna pattern comprises an NFC (near field communication) antenna.

3. The antenna of claim 1, wherein the low frequency antenna pattern comprises a wireless charging coil for charging a battery of a terminal including the antenna.

4. The antenna of claim 1, wherein the magnetic sheet comprises a ferrite sheet.

5. The antenna of claim 1, wherein each of the high frequency antenna pattern and the low frequency antenna pattern is exposed via both surfaces of the flexible board by passing through the flexible board.

6. The antenna of claim 1, wherein the magnetic sheet has a magnetic permeability (μr) of 130~190 in a frequency range between 100 kHz and 14 MHz.

7. An antenna, comprising:
   a flexible board having a first region and a second region;
   a high frequency antenna pattern formed in the first region of the flexible board to transceive a wireless signal by detecting a magnetic flux;
   a low frequency antenna pattern formed in the second region of the flexible board to generate an induced current;
   a magnetic sheet stacked on one surface of the flexible board to simultaneously cover both of the high frequency antenna pattern and the low frequency antenna pattern, the magnetic sheet having a high magnetic permeability for both a high frequency and a low frequency;
   a pair of first connecting terminals passing through the magnetic sheet to be connected with both ends of the low frequency pattern, respectively; and a pair of second connecting terminals passing through the magnetic sheet to be connected with both ends of the high frequency pattern, respectively.

8. The antenna of claim 7, wherein the first connecting terminals and the second connecting terminals are exposed via a surface of the magnetic sheet by passing through the magnetic sheet.

9. A mobile terminal, comprising:
a case forming an exterior of the mobile terminal and including electronic components mounted inside;
a backside cover configured to cover one side of the case; and
an antenna attached to an inner surface of the backside cover,
wherein the antenna comprises:
a flexible board having a first region and a second region;
a high frequency antenna pattern formed in the first region of the flexible board to transceive a wireless signal by detecting a magnetic flux;
a low frequency antenna pattern formed in the second region of the flexible board to generate an induced current; and
a magnetic sheet stacked on one surface of the flexible board to simultaneously cover both of the high frequency antenna pattern and the low frequency antenna pattern, the magnetic sheet having a high magnetic permeability for both a high frequency and a low frequency,
wherein the high and low frequency antenna patterns each have a whirling shape, and
wherein the high and low frequency antenna patterns are disposed in a same plane.

10. The mobile terminal of claim 9, wherein the high frequency antenna pattern comprises an NFC (near field communication) antenna and the low frequency antenna pattern comprises a wireless charging coil.

11. The mobile terminal of claim 9, wherein the magnetic sheet comprises a ferrite sheet.

12. The mobile terminal of claim 9, wherein each of the high frequency antenna pattern and the low frequency antenna pattern is exposed via both surfaces of the flexible board by passing through the flexible board.

13. The mobile terminal of claim 9, further comprising:
a pair of first connecting terminals passing through the magnetic sheet to be connected with both ends of the low frequency pattern, respectively; and
a pair of second connecting terminals passing through the magnetic sheet to be connected with both ends of the high frequency pattern, respectively.

14. The mobile terminal of claim 13, further comprising:
a first body terminal provided to the one side of the case and configured to be connected with a printed circuit board within the case,
wherein when the backside cover is attached to the case, the first connecting terminal is connected with the first body terminal by passing through the magnetic sheet to be exposed via a surface of the magnetic sheet.

15. The mobile terminal of claim 13, further comprising:
a second body terminal provided to the one side of the case and configured to be connected with a battery,
wherein when the backside cover is attached to the case, the second connecting terminal is connected with the second body terminal by passing through the magnetic sheet to be exposed via a surface of the magnetic sheet.

16. The mobile terminal of claim 9, further comprising:
a recessed part provided to an inner surface of the backside cover to receive the antenna therein.

17. The mobile terminal of claim 9, wherein the magnetic sheet has a magnetic permeability (μr) of 130~190 in a frequency range between 100 kHz and 14 MHz.

18. The mobile terminal of claim 9, wherein the low frequency antenna pattern comprises a wireless charging coil for charging a battery of the mobile terminal.

* * * * *